United States Patent [19]

White et al.

[11] Patent Number: 5,053,793

[45] Date of Patent: Oct. 1, 1991

[54] ELECTROGRAPHIC MARKING WITH DITHERED STYLUS GROUP BOUNDARIES TO ELIMINATE STRIATIONS

[75] Inventors: Stephen D. White, Santa Clara; Lorin K. Hansen, Fremont; Keith E. McFarland, Woodside, all of Calif.; Jack H. Sayre, St. Johns, Canada

[73] Assignee: Xerox Corporation, Stamford, Conn.

[21] Appl. No.: 530,719

[22] Filed: May 30, 1990

[51] Int. Cl.$^5$ ............................................. G01D 15/06
[52] U.S. Cl. .................................. 346/154; 346/153.1; 346/155; 346/1.1
[58] Field of Search ...................... 346/153.1, 154, 155, 346/1.1, 107 R, 108

[56] References Cited

U.S. PATENT DOCUMENTS

| | | | |
|---|---|---|---|
| 4,054,885 | 10/1977 | Rothgordt | 346/154 |
| 4,258,373 | 3/1981 | Arnoldi et al. | 346/154 |
| 4,271,417 | 6/1981 | Blumenthal et al. | 346/154 |
| 4,430,661 | 2/1984 | Tarumi et al. | 346/153.1 |
| 4,438,444 | 3/1984 | Komada et al. | 346/155 |
| 4,602,262 | 7/1986 | Milligan et al. | 346/153.1 X |

Primary Examiner—Benjamin R. Fuller
Assistant Examiner—Randy W. Gibson
Attorney, Agent, or Firm—Serge Abend

[57] ABSTRACT

A method of producing an electrostatic image along scan lines of a recording medium with recording means including a series of stylus electrodes arranged in a longitudinally extending array and divided into two groups, with the stylus members of each group being connected in parallel with one another along the array. A series of complementary electrodes is arranged in a longitudinally extending array and cooperates with sets of stylus electrodes for depositing a charge pattern upon a selected region of recording medium when the sets of stylus electrodes and selected complementary electrodes are pulsed contemporaneously. The method comprises the steps of delivering data, comprising a writing potential or a non-writing potential, to the stylus electrodes of both groups, and overriding certain of the data with a non-writing potential for defining the sets of stylus electrodes within the groups.

5 Claims, 6 Drawing Sheets

ELECTROGRAPHIC MARKING WITH DITHERED STYLUS GROUP BOUNDARIES TO ELIMINATE STRIATIONS

FIELD OF THE INVENTION

This invention relates to electrostatic recorders in which writing is accomplished by contemporaneously pulsing the voltage of sets of recording stylus electrodes, arranged in an array, with selected complementary electrodes. More particularly, it relates to laterally shifting, or dithering, the boundaries of the sets of stylus electrodes in subsequent scan lines so as to prevent the set boundaries from being aligned, in order to eliminate visible striations extending in the process direction.

BACKGROUND OF THE INVENTION

Electrographic marking upon an image recording medium comprises a two-stage process. First, air ions are created and charged ions of a given sign (usually negative) are deposited at selected image pixel locations to form an electrostatic charge image on a recording medium. Then, the electrostatic charge image is made visible by "toning", which usually involves the passing of the recording medium bearing the latent (non-visible) image, into contact with a liquid solution containing positively charged dye particles in a colloidal suspension. The dye particles will be attracted to the negative charge pattern and the density of the dyed image will be proportional to the potential or charge on the medium.

Two types of recording media that are in common usage are paper and film. The paper is usually treated to make its bulk conductive and a dielectric layer of about 0.5 mil thick is coated upon its image bearing side. In its dielectric film form, a substrate such as Mylar ®, has a very thin conductive layer and an overcoat dielectric layer coated upon its image bearing side. Conductive side stripes pass through the dielectric layer to the conductive layer provide electrical paths to the conductive layer. In the case of paper, the potential established in the conductive layer is obtained by a combination of resistive and capacitive coupling, and in the case of film, the potential established in the conductive layer is obtained by capacitive coupling.

Conventionally, as illustrated in FIG. 1, an electrostatic image is formed upon a recording medium 10 having a thin surface dielectric layer 12 coated upon a conductive paper base material 14. The recording medium is passed between a recording head 16 and an array of complementary electrodes 18. The recording head includes an array of recording stylus electrodes 20, divided into groups, embedded in a dielectric supporting member 22. In the drawing, the complementary electrodes are in the form of backplates which conform to the contour of the recording medium for intimate contact therewith. Alternatively, they may straddle the stylus electrodes, on the same side of the recording medium. Throughout this document the term backplate will be used interchangeably with complementary electrode and it should be understood that frontplate electrodes are contemplated as well.

When the potential difference between the stylus electrodes and the recording medium conductive layer rises enough to cause the voltage in the air gap to exceed the breakdown threshold of the air, the air gap becomes ionized and air ions of the opposite sign to the potential of the conductive layer are attached to the surface of the dielectric layer. As the dielectric surface charges up, there is a corresponding drop in voltage across the gap, so that when the voltage across the gap drops below the maintenance voltage of the discharge, the discharge extinguishes, leaving the dielectric surface charged. The discharge potential is established by applying a voltage of a first polarity, e.g. on the order of −300 volts, to the stylus electrodes contemporaneously with the application of a substantially equal voltage of the opposite polarity, e.g. +300 volts, to the complementary electrodes. This causes the electrical discharge, imposing a localized negative charge to the surface of the dielectric layer 12 of the recording medium.

Typical electrographic plotters range in width from 11 inches to 44 inches, and in some cases even as wide as 72 inches, with the writing head stylus array extending across the width. Since images are usually formed at resolutions of 200 to 400 dots per inch, there are from 2000 to over 17,000 styli in a single array. Because of this very large number of styli it is not yet economically attractive to use one driver or switch per stylus. For this reason, a multiplexing arrangement is commonly used in conjunction with the discharge method described above wherein one part of the total voltage, necessary for electrographic writing, is imposed upon a stylus group and the remaining part of the necessary voltage is imposed upon its complementary electrode. The styli in the writing head array are divided into a number of stylus electrode groups (each group being about 0.5 inch to 1.5 inches in length) so that each may consist of several hundred styli.

In order to reduce the number of drivers needed, since one driver can be used for many styli, like styli in each group of stylus electrodes are wired in parallel so that they carry the same information. Then, in order to cause a selected stylus group to write, its complementary electrode is selectively pulsed. It is well known that any practical number of groups is possible. In FIG. 2 there is illustrated the conventional form for the multiplexed addressing of two alternating stylus electrode group (referred to as "A"s and "B"s). The recording medium 10 passes between the stylus groups 20 and the backplates 18. Each commonly numbered stylus in each "A"-stylus group is wired in parallel with each like numbered stylus in every other "A"-stylus group. Similarly, all "B"-stylus groups are wired in parallel. Each of the stylus groups is the same length as the complementary electrode and they are offset with respect to one another so that two adjacent complementary electrodes are needed to cause a writing discharge from one stylus group. By having two complementary electrodes generally centered relative to a given selected stylus group, the voltage across the recording medium can be expected to be uniform. Although the leading and trailing alternate stylus groups adjacent to the given selected stylus group are also influenced by an overlapping portion of the selected complementary electrodes they will not write because they are not addressed and enabled.

A related patent application filed contemporaneously herewith and fully incorporated by reference herein, identified by U.S. Ser. No. 07/532,467 filed on May 30, 1990 entitled "Electrographic Marking With Modified Addressing To Eliminate Striations" relates to the formation of objectionable striations introduced by pulsing of the complementary electrodes, and to a method for eliminating them by changing the stylus electrode group firing sequence.

We have found that the pulsing of the stylus electrode groups themselves are a cause of other striations extending in the process direction which appear as enhanced, or darker, areas at the electrode group boundaries. The styli themselves can be brought of as small electrodes that are capacitively coupled to the conductive layer of the recording medium, in a manner comparable to the effect of the complementary electrodes upon the recording medium. Although the styli are small they are closer (in the case of film) to the conductive layer than are the backplate electrodes and therefore have more capacitance per unit area with respect to the conductive layer than do the backplates. When the styli are pulsed, they also pulse the conductive layer which must dampen out that potential perturbation before the full voltage is available for writing.

For simplicity, we discuss the model of writing all black, wherein all the styli in a set are pulsed ON to a writing potential. The potential on the recording medium conductive layer adjacent to the styli is pulsed negative when the styli are pulsed negative. At both edges of a stylus electrode set, the potential of the conductive layer relaxes away faster than the potential on the conductive layer in the center of an electrode set so that the potential difference between the styli and the medium in those areas is greater. As a result, the edge areas of the stylus electrode sets accumulate more charge and write darker than the center of the sets. Therefore, as the plotter writes, the aligned edges result in dark stripes extending in the direction of movement of the recording medium (i.e. the process direction).

It is the primary object of the present invention to improve the uniform appearance of writing by preventing the alignment of stylus electrode set edges which can be accomplished by dithering the sets in subsequent line scans.

It is another object of the present invention to selectively determine the lateral location of stylus electrode sets within a scan line with a zero mask.

It is yet another object of the present invention to increase the lateral distances that the stylus electrode sets may be shifted by reducing the length of the backplate electrodes.

SUMMARY OF THE INVENTION

These and other objects may be carried out, in one form, by producing an electrostatic image along scan lines of a recording medium with recording means including a series of stylus electrodes arranged in a longitudinally extending array and divided into two groups, with the stylus members of each group being connected in parallel with one another along the array. A series of complementary electrodes is arranged in a longitudinally extending array and cooperates with sets of stylus electrodes for depositing a charge pattern upon a selected region of recording medium when the sets of stylus electrodes and selected complementary electrodes are pulsed contemporaneously. More particularly, this method comprises the steps of delivering data, consisting of a writing potential or a non-writing potential, to the stylus electrodes of both groups, and overriding certain of the data with a non-writing potential for defining the sets of stylus electrodes within the groups.

BRIEF DESCRIPTION OF THE DRAWINGS

Other objects and further features and advantages of this invention will be apparent from the following, more particular, description considered with the accompanying drawings, wherein.

DETAILED DESCRIPTION OF THE PREFERRED EMBODIMENTS

A more complete understanding of the time varying potential distribution in the conductive layer of the recording medium, as influenced by the stylus electrode groups which give rise to edge enhanced writing, may be seen in FIGS. 3a through 3d. For ease of explanation and understanding, it is assumed that a writing potential is imposed upon all of the stylus electrodes in each pulsed group (represented by "ones" in FIG. 6), as they would be when writing a solid area.

Figure 3A:
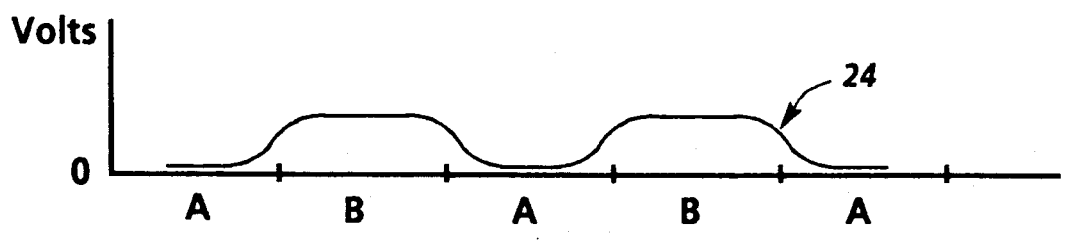
FIG. 3a through 3d are graphical illustrations of potential variations in the recording medium taken at different times to show the genesis of the enhanced group edges.
Figure 3B:
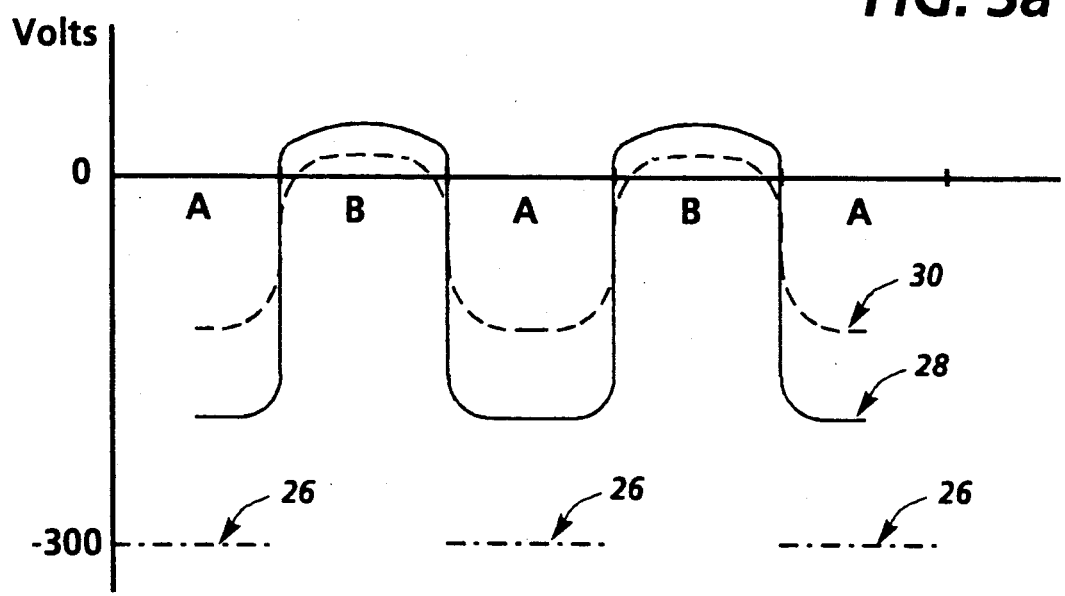
Figure 3C:
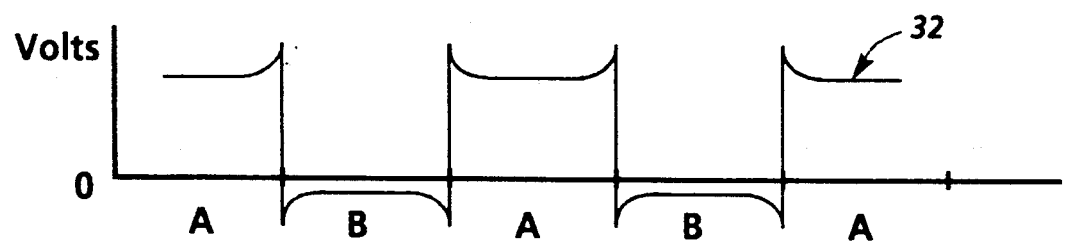
Figure 3D:
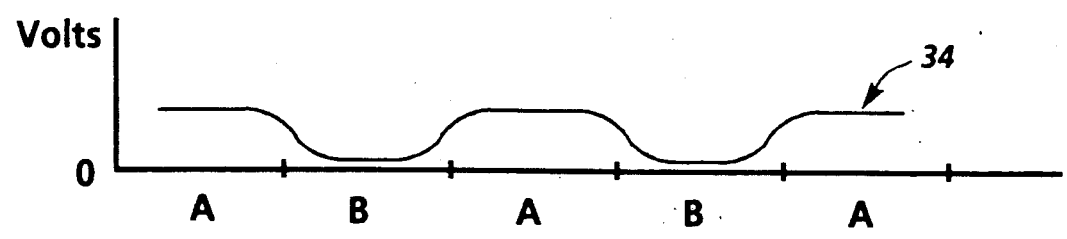
Figure 4:
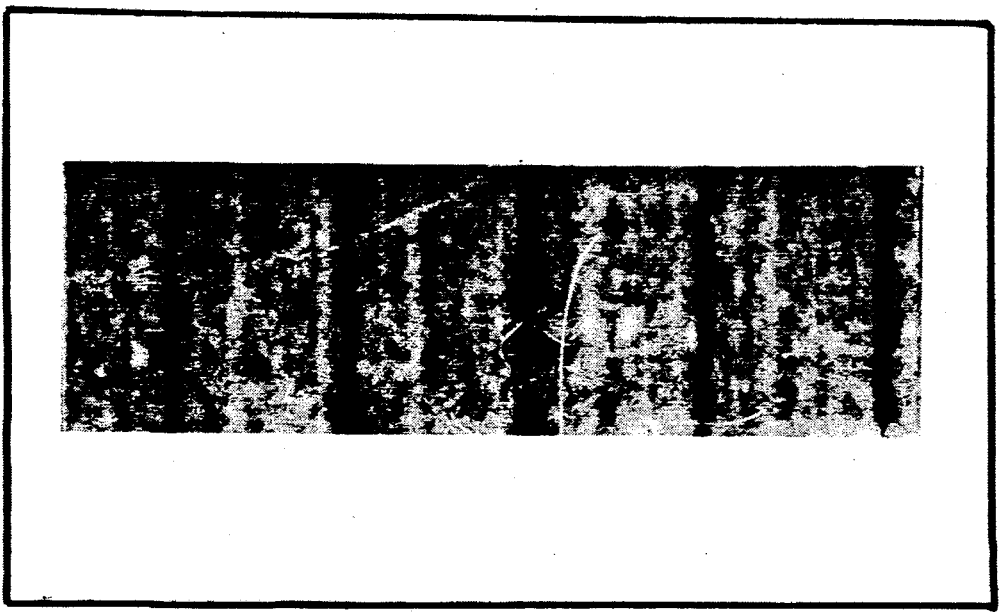
FIG. 4 is a photograph showing the striation defect at the group boundaries in conventional solid area writing.
Figure 5:
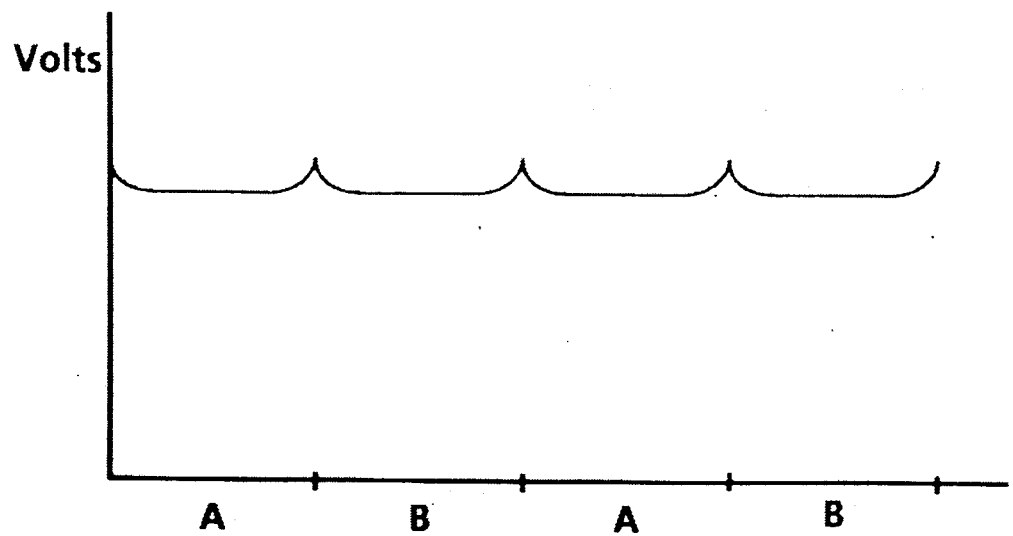
FIG. 5 is a graphical representation of the group boundary enhancement observable in FIG. 4.

The sequence shown in these drawings is arbitrarily selected to begin at some time during the writing process and curve 24 of FIG. 3a represents a relaxed state of the conductive layer (approaching a reference voltage) some time after stylus electrode groups "B" have been pulsed OFF as will be understood. In FIG. 3b the styli in group "A" have been pulsed ON to a voltage of about −300 volts as indicated at 26, driving the conductive layer negative, to substantially follow curve 28. The magnitude of the negative excursion will be affected, among other factors, by the potential on the backplates as well as that on the styli, and their relative distance from the conductive layer. Curve 30 represents the potential distribution in the conductive layer a short while after the group "A" styli have fired, during which interval some relaxation can be seen to have occurred. As relaxation continues a discharge occurs when the potential difference between the styli and the recording medium, across the air gap, exceeds the breakdown threshold potential for air. Once the discharge has been initiated, it continues even as potential relaxation continues in the conductive layer, building up more and more charge on the recording medium. It should be noted that the potential history of FIG. 3a causes the edges of the stylus electrode group to vary abruptly, giving rise to the larger potential difference at those locations and resulting in a greater charge buildup thereat. Curve 32 in FIG. 3c shows a reverse excursion in the potential distribution that occurs as group "A" is pulsed OFF (i.e. to the reference voltage). It should be noted that this excursion of about 300 volts is followed by the conductive layer, which is driven to a positive potential. Finally curve 34 of FIG. 3d shows the potential a short time layer, after the conductive layer has had time to relax and before the group "B" styli are pulsed. The resultant potential pattern having cusp-like increases located at the stylus group edges, as shown in FIG. 5, occurs across each scan line. As writing continues from line to line, alignment of the stylus electrode groups causes striations, which clearly appear as darkened lines extending in the process direction in the photograph of FIG. 4.

Figure 1:
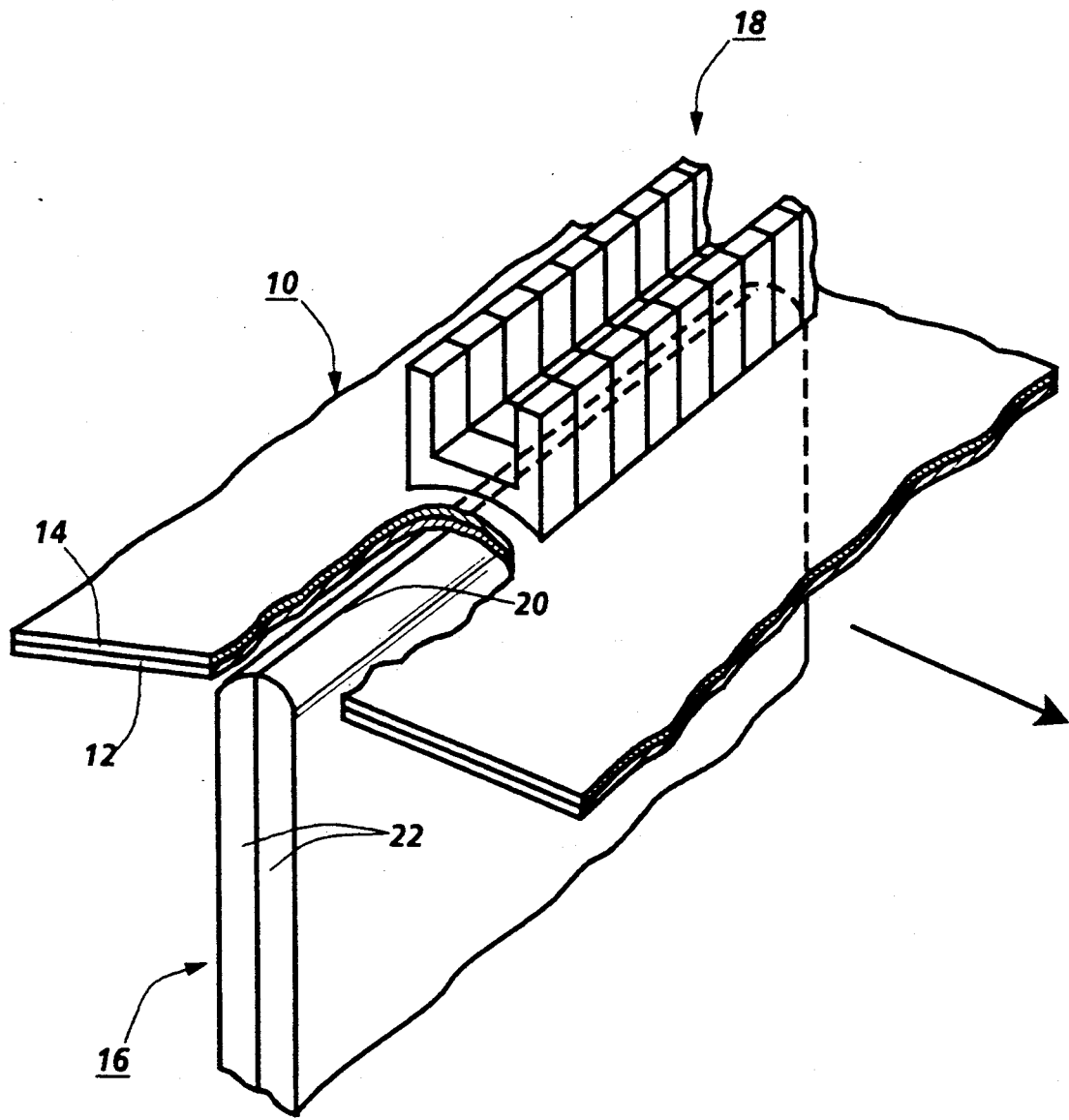
FIG. 1 is a perspective view showing a conventional electrographic writing head relative to a recording medium.
Figure 2:
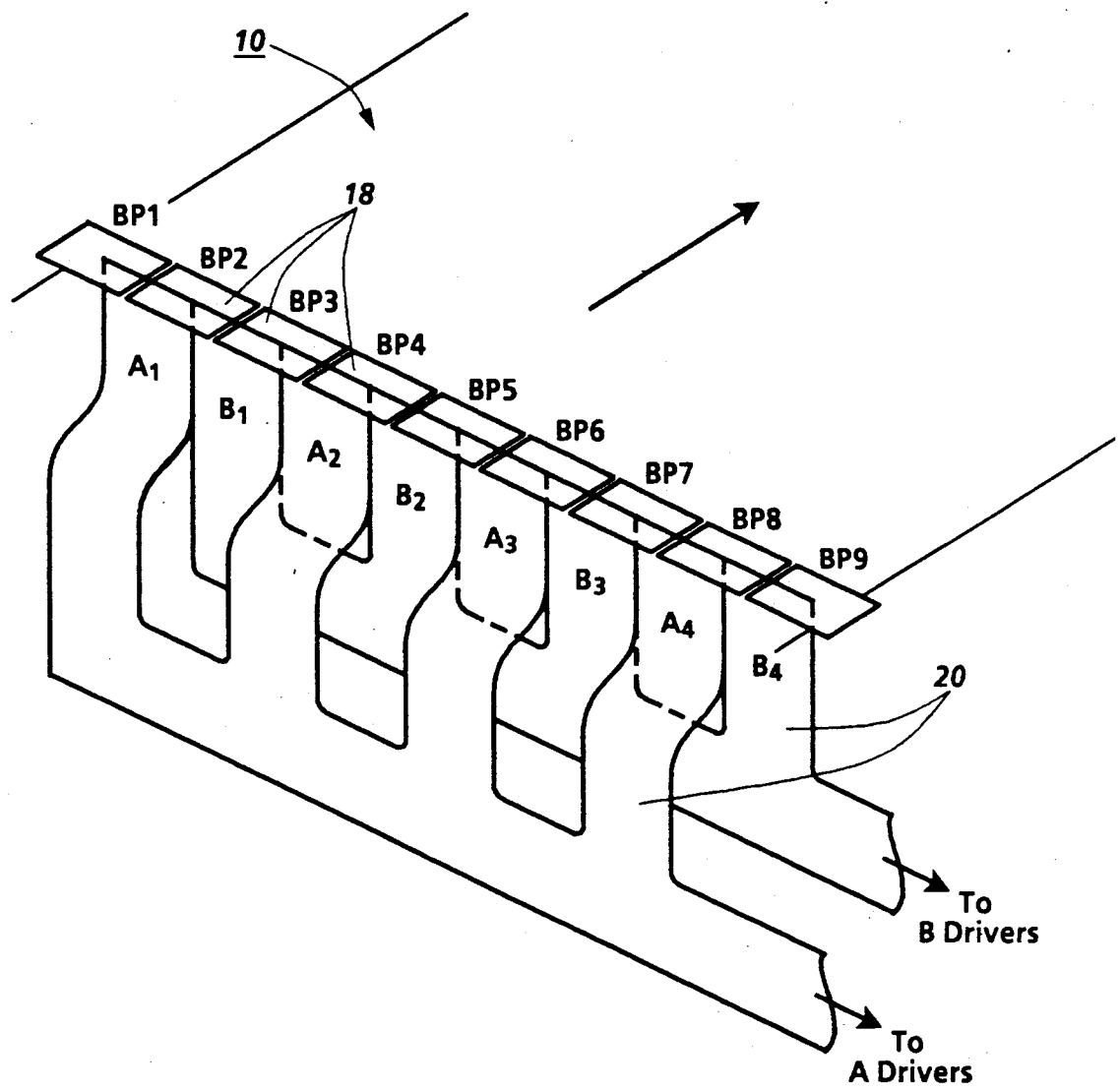
FIG. 2 is a schematic perspective view showing the interrelationship between the A and B writing groups and their complementary electrodes
Figure 6:
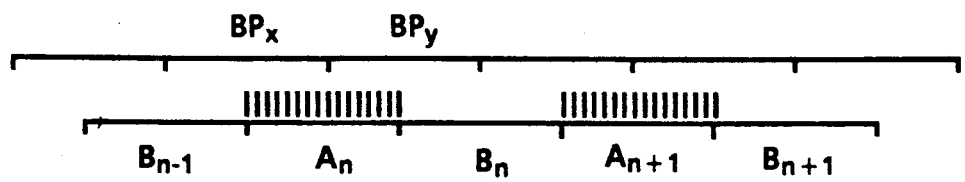
FIG. 6 is a graphical illustration of conventional multiplex printing.

In accordance with our invention it is possible to render the increased density stylus electrode group edges less visible (in some cases nonvisible) by preventing alignment of the group edges by laterally shifting (dithering) them from scan line to scan line. This solution has not been thought possible with conventional multiplexed addressing of the styli, as illustrated in FIG. 2 and described above. In the conventional case all of the styli along the head are divided into groups alternately designated "A" groups and "B" groups. All corresponding styli in every "A" group are connected in parallel as are all corresponding styli in every "B" group, so that the pulsing of all "A" groups alternates with the pushing of all "B" groups. By the appropriately selecting a pair of complementary electrodes to be pulsed, a particular group in the array will write. As illustrated in FIG. 6, all the "A" groups are being addressed and group $A_n$ is selected to write by pulsing backplate electrodes $BP_x$ and $BP_y$.

Figure 7A:
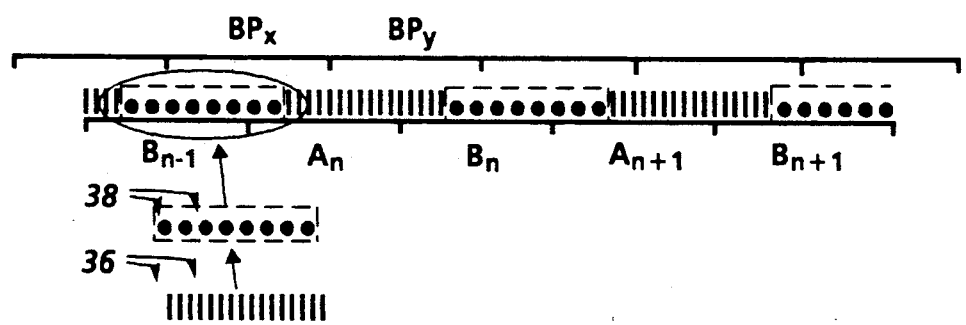
FIGS. 7a and 7b are graphical illustrations of dithered matrix printing in accordance with the present invention.
Figure 7B:
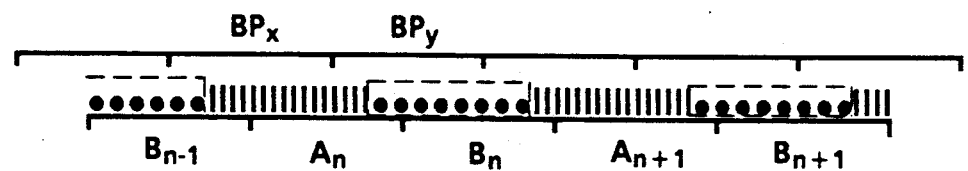
Figure 8:
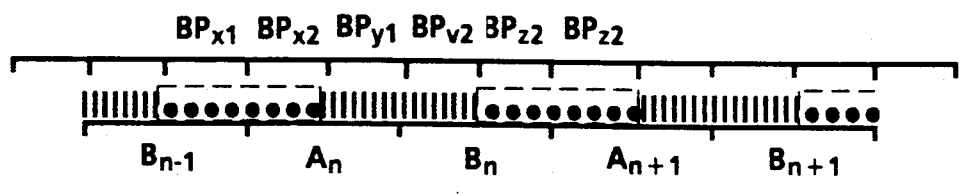
FIG. 8 is a graphical illustration of the use of segmented backplates for allowing a greater range of dithering movement.

By contrast, in the present invention, all the drivers ("A" s and "B" s) are simultaneously addressed, so it should be understood that there are no "A" groups or "B" groups per se although we have used that convention in FIGS. 7a, 7b and 8 in order to relate the regions to the known multiplexing technique. The potential addressed to each stylus may be a write potential, which may be on the order of $-300$ volts, indicated by a one, or a non-write potential, which may be on the order of 0 volts, indicated by a zero. Data, in the form of a digital signal, is imposed on each stylus in the array and, although it may be a one or a zero, for the sake of clarity only ones are shown, representing solid area writing. In order to shift the boundaries of the stylus electrode sets carrying data, either to the right (FIG. 7a) or to the left (FIG. 7b), a zero mask is provided to override the data train with zeros, thereby selecting the length and location of the stylus electrode set which will include data. This is graphically indicated in FIG. 7a where each bit of incoming data 36 is masked by an overriding zero 38 in order to mask the interset regions.

The selected set of stylus electrodes in FIG. 7a has been shifted to the right (relative to the "A" groups) by about one quarter group distance. It receives mostly "A" group data and some "B" group data, and is repeated every "A/B" group. The remainder of the "A" and the "B" group data is overridden by zeros and will not be able to write. Selection of the desired $A_n/B_n$ stylus electrode set for writing is effected by pulsing complementary electrodes $BP_x$ and $BP_y$. In FIG. 7b, the "A/B" stylus electrode set has been shifted to the left by about one quarter group distance so that it includes mostly "B" group data and some "A" group data. It can be clearly seen that with the present technique it is possible to move the group to any desired lateral position (dithering) from scan line to scan line in order to prevent the alignment of the objectionable enhanced group boundaries.

In order to obtain even changing of the recording medium the pair of complementary electrodes are generally centered over the stylus electrode groups, as shown in FIG. 6, since the potential they impose in the conductive layer relaxes rapidly at the remote ends. In the conventional plotter they are offset so that one half of each is centered over the electrode group. For this reason, when utilizing the method of the present invention with the standard hardware, it is undesirable to shift the stylus electrode set more than one-quarter the length of a stylus group beyond the group boundary (as shown in FIGS. 7a and 7b). A greater shift would cause data to cooperate with an indeterminate complementary electrode potential.

However, increased shifting flexibility may be obtained by reducing the length of the complementary electrodes, for example, to one half of the length of the electrode groups, as shown in FIG. 8. With shorter complementary electrodes, it is possible to shift these electrodes as well in order to follow the shifted stylus electrode set. Thus, in FIG. 8, stylus electrode set $A_n/B_n$ has been shifted to the right by one half the length of a stylus group beyond the group boundary and electrodes $BP_{x2}$, $BP_{y1}$, $BP_{y2}$, and $BP_{z1}$ would be pulsed for writing that set.

Figure 9:
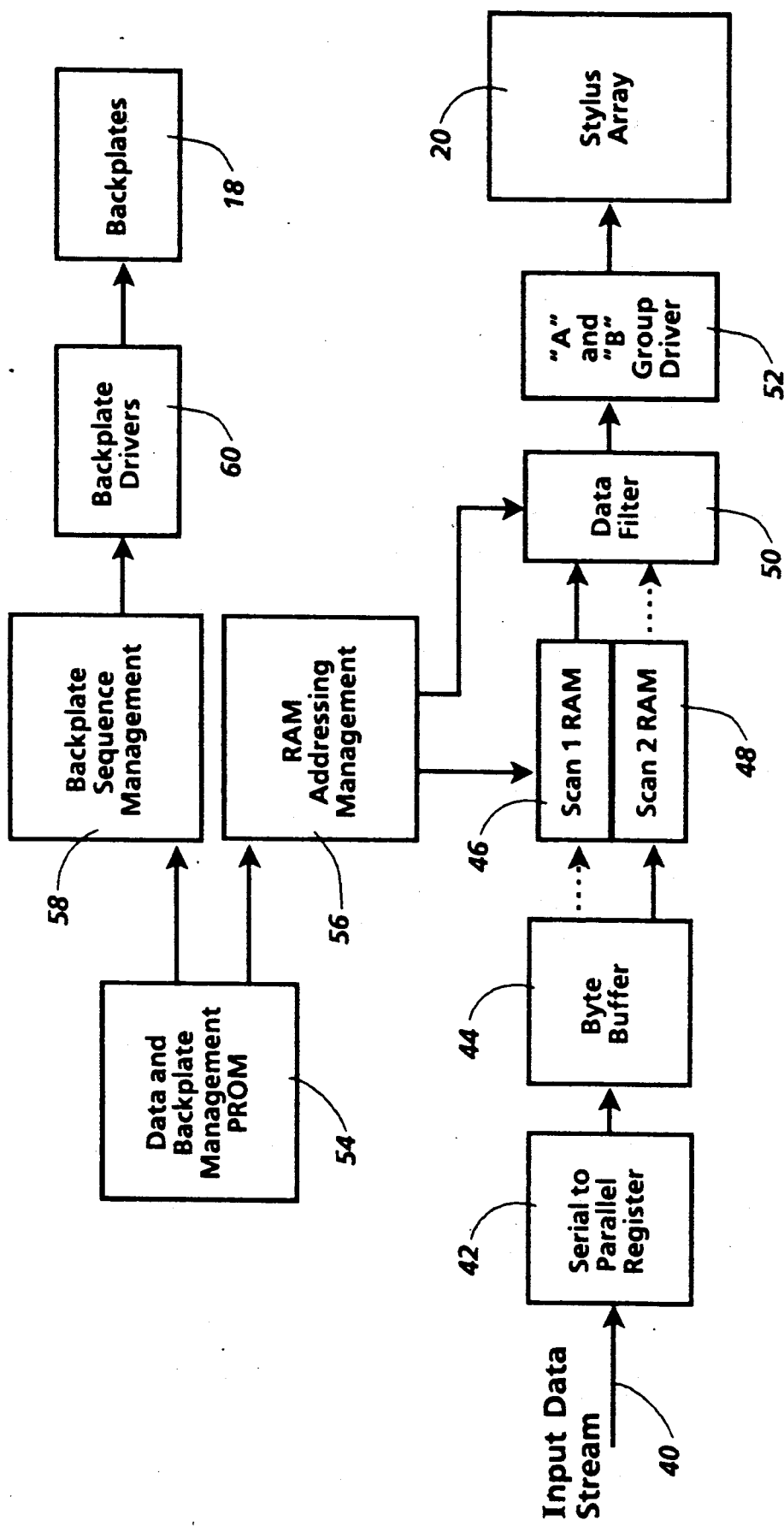
FIG. 9 is a block diagram of a control circuit for controlling the writing method of the present invention.

Control of the data loading is effected by a circuit of the type shown in the block diagram of FIG. 9. An input serial data stream 40, received from an electronic buffer in the plotter (not shown), enters the Serial to Parallel Register 42 where it fills an eight bit register and moves out in bytes which fill the Byte Buffer 44. The bytes are passed serially first into Scan 1 RAM 46 and then into Scan 2 RAM 48, each of which stores an entire scan line. The alternate feeding of data into each of the RAMs and then out of them is graphically indicated by the convention of using solid and dotted arrows, from which it can be seen that Scan 2 RAM is being loaded and that Scan 1 RAM has already been loaded and is being unloaded. Selected "A" and "B" group data from the Scan 1 RAM passes through a Data Filter 50 (the zero mask, which may comprise an AND gate) where zeros are introduced into the data stream to override selected "A" and "B" group data. Next, the data stream is fed to "A" and "B" Group Driver 52 to approximately load the Stylus Array 20.

The Data and Backplate Management PROM 54 instructs the RAM Addressing Management 56 which portion of the scan line to feed from the Scan 1 RAM, instructs the Data Filter 50 where to initiate and terminate the introduction of zeros to override the data, and simultaneously instructs the Backplate Sequence Management 58 to control the correct Backplate Drivers 60 for pulsing a selected pair of Backplates 18 complementary to the stylus electrode set. After the entire scan line has been unloaded from Scan 1 RAM, Scan 2 RAM is unloaded in the same manner while Scan 1 is being loaded with the next scan line of data.

It should be understood that the present disclosure has been made only by way of example and that numerous other changes in the sequence of operation of the plotter may be resorted to without departing from the true spirit and scope of the invention as hereinafter claimed.

What is claimed:

1. A method of producing an electrostatic image along scan lines of a recording medium, comprising a conductive layer and a dielectric layer, with recording means including a series of stylus electrodes arranged in a longitudinally extending array and divided into a series of groups, a driver associated with each stylus electrode of a group connects like stylus electrodes of each group in parallel with one another and enables a delivery of a write potential or a non-write potential to said stylus electrodes, each stylus electrode terminating adjacent to said dielectric layer, a series of complementary electrodes arranged in a longitudinally extending array for cooperating with sets of stylus electrodes for depositing a charge pattern upon a selected region of said dielectric layer when said sets of stylus electrodes and selected complementary electrodes are pushed contemporaneously, said method comprising the steps of:

delivering a digital signal to said drivers, for passing a write potential or a non-write potential to said stylus electrodes of said series of groups, and overriding ones of said digital signals passing write potentials with said digital signals passing non-write potentials for defining said sets of stylus electrodes within said groups.

2. The method of producing an electrode image as defined in claim 1 including laterally shifting the position of said sets of stylus electrodes within said groups from scan line to scan line.

3. The method of producing an electrostatic image as defined in claim 2 further including laterally shifting a position of said selected complementary electrodes in the same direction as said sets of stylus electrodes are shifted.

4. A method of producing an electrostatic image along scan lines of a recording medium, comprising a conductive layer and a dielectric layer, with recording means including a series of stylus electrodes arranged in a longitudinally extending array and divided into a series of groups, the stylus electrodes of each group being connected in parallel with one another along said array, each stylus electrode terminating adjacent to said dielectric layer, a series of complementary electrodes arranged in a longitudinally extending array for cooperating with sets of stylus electrodes for depositing a charge pattern upon a selected region of said dielectric layer when said sets of stylus electrodes and selected complementary electrodes and pulsed contemporaneously, said method comprising the steps of:

defining said sets by locating lateral end stylus electrodes within said groups, and preventing formation of visible striations extending in in a direction of movement of the image due to line to line alignment of said lateral end stylus electrodes by laterally shifting a position of said sets of stylus electrodes within said groups.

5. The method of producing an electrostatic image as defined in claim 4 further including laterally shifting a position of said selected complementary electrodes in the same direction as said sets of stylus electrodes are shifted.

* * * * *